March 2, 1926.
A. E. ALCHIN
1,574,743
GAUGE BOX FOR ICE CREAM FREEZERS
Filed July 3, 1924
2 Sheets-Sheet 1
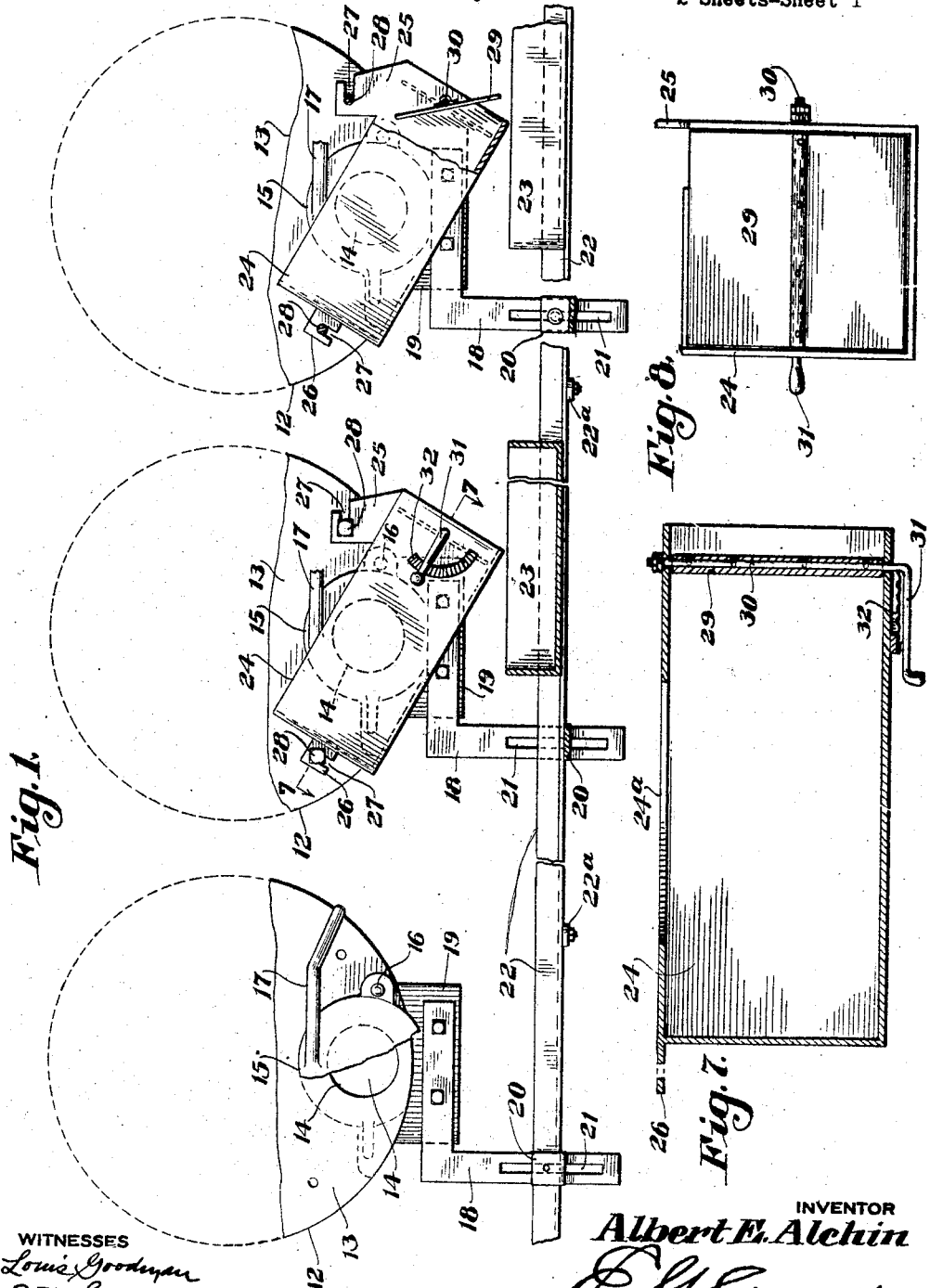
WITNESSES
Louis Goodman
E. N. Lovewell
INVENTOR
Albert E. Alchin
BY
ATTORNEY March 2, 1926.  1,574,743
A. E. ALCHIN
GAUGE BOX FOR ICE CREAM FREEZERS
Filed July 3, 1924  2 Sheets-Sheet 2
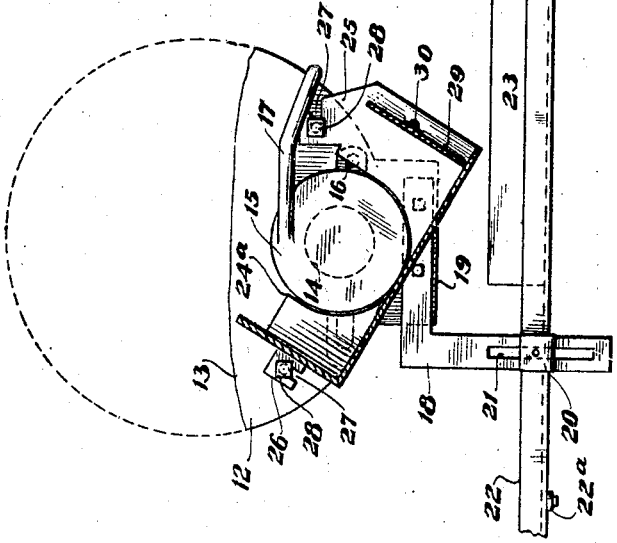
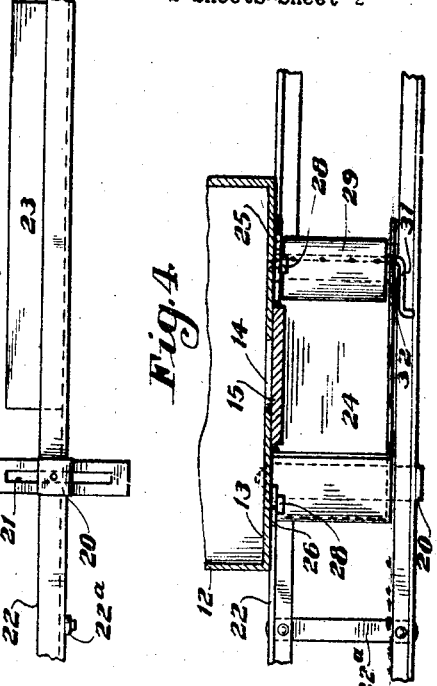
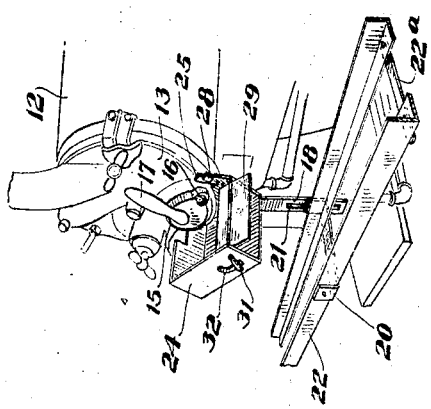
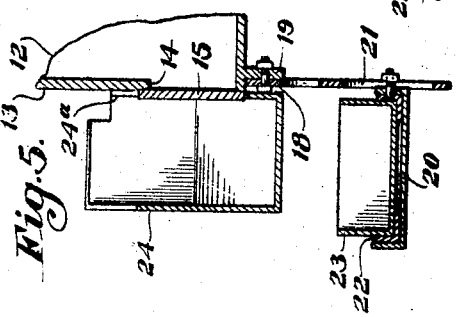
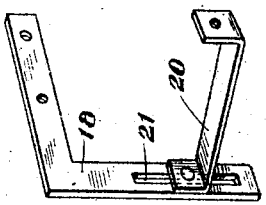
WITNESSES
INVENTOR
Albert E. Alchin
BY
ATTORNEY Patented Mar. 2, 1926.

1,574,743

UNITED STATES PATENT OFFICE.

ALBERT ERNEST ALCHIN, OF PERTH AMBOY, NEW JERSEY.

GAUGE BOX FOR ICE-CREAM FREEZERS.

Application filed July 3, 1924. Serial No. 724,046.

*To all whom it may concern:*

Be it known that I, ALBERT E. ALCHIN, a citizen of the United States, residing at Perth Amboy, in the county of Middlesex and State of New Jersey, have invented a new and useful Gauge Box for Ice-Cream Freezers, of which the following is a specification.

This invention relates to a gauge box and parts associated therewith, adapted especially for filling molds used in the manufacture of ice cream in brick form.

The principal object of the invention is to provide a device adapted to be attached directly to the head of the freezer and to receive the cream therefrom while still in a plastic state, the entire assembly being arranged primarily to avoid waste and to handle the cream in a sanitary manner.

It is also possible with my invention to manufacture the cream in brick form more expeditiously than heretofore and to produce a more uniform product, thereby effecting a saving in labor and expense.

The objects and advantages of the invention will be more specifically explained in the following detailed description taken in connection with the accompanying drawings, which illustrate the invention in its preferred form.

In the drawings:

Figure 1 is a front view illustrating the arrangement of the invention in connection with a series of freezers, parts being broken away and other parts shown in section.

Figure 2 is a perspective view of the invention.

Figure 3 is a longitudinal vertical section through the gauge box, with the associated parts shown in elevation.

Figure 4 is a plan view of the invention with the adjacent end of the freezer shown in section.

Figure 5 is a transverse sectional view of the invention.

Figure 6 is a perspective view of one of the adjustable brackets.

Figure 7 is a section taken on the line 7—7 of Figure 1.

Figure 8 is an end elevation of the gauge box.

In the manufacture of ice cream, a number of freezers 12 are usually arranged side by side, each containing a different flavor. The head 13 of each freezer is provided with an opening 14 closed by a door 15, which is pivoted at 16 and provided with a handle 17 for opening and closing the same.

In carrying out my invention, a bracket member 18 is secured to the base 19 of each freezer depending therefrom, and a second horizontal bracket member 20 is connected for vertical adjustment to the depending arm of the member 18 by means of a bolt secured in a vertical slot 21. A pair of tracks 22 are adapted to rest on the bracket members 20. These tracks are preferably formed of two opposed angle irons connected by transverse straps 22$^a$, so that they may be conveniently handled as a unit. The tracks 22 are suitably spaced to receive a mold box 23 of the usual size and shape, and which may be easily moved along the tracks and stationed successively beneath each freezer.

A gauge box 24 is attached to the head 13 of each freezer beneath the opening 14, and is adapted, when the door 15 is open, to receive the plastic cream which flows from the freezer, and to direct it into the mold box 23. The box 24 is preferably rectangular in shape with an open top, and with its rear side cut away, as shown at 24$^a$, to fit around the circular door 15 beneath the opening 14. Ears 25 and 26 are secured in any suitable manner to the rear side and end, respectively, of the box 24, each ear being provided with a slot or opening 27 for receiving a bolt 28, which is secured in the head 13 of the freezer in such a manner that the gauge box is supported in an inclined position, as shown best in Figures 1, 2 and 3. The lower end of the box 24 is formed by a gate 29, which is centrally secured to a horizontal rod or shaft 30, supported for rocking movement in the sides of the box, and having at one end a crank arm 31, which cooperates with a segment 32 formed on the front side of the box for latching the gate in closed position as shown in Figure 3 and in the central part of Figure 1, or in open position as shown in Figure 2 and in the right hand portion of Figure 1.

In the operation of the invention, the bracket members 20 are adjusted so as to support the tracks 22 in such position that the mold box 23 will ride thereon, and just clear the lower ends of the gauge boxes. In filling the mold box, it is stationed successively beneath the heads of the freezers containing the desired flavors. Each door 15 is opened to permit the proper amount of cream to flow into the gauge box, and as the mold box is brought beneath each gauge box, the gate 29 thereof is opened to allow the cream to flow into the mold box. The gauge box guides the cream, so that it flows evenly into the mold box, although it is in a semi-liquid condition. The process is perfectly sanitary, the cream can not come in contact with the hands of the operator, and the cream is discharged directly into the mold box absolutely without waste. The invention also effects a considerable saving in time and labor, since all of the different flavors may be poured into the mold box, and will lie uniformly therein until the entire brick is refrozen.

While I have shown and described the specific details of construction which constitute the preferred form of the invention, it will be understood that this is merely for the purpose of illustration, and that various modifications may be made therein without departing from the salient features of the invention. The same structure may also be used in handling other materials of like nature which are to be packed in a similar manner.

What is claimed is:

1. The combination with a freezer having a head provided with a discharge opening, of a gauge box secured to said head and having a portion of its rear side wall cut away so as to fit beneath and partially around said opening, said box having an inclined bottom, and a pivoted gate forming the end of said box adjacent the lower end of said bottom.

2. The combination with a container having a head provided with a discharge opening, of a rectangular gauge box secured to said head in an inclined position to receive material which is discharged from said opening, the rear wall of the gauge box having a portion cut away so as to fit beneath and partially around said opening, and a gate at the lower end of the box through which the material may be discharged into a mold box supported therebeneath.

3. A gauge box provided with means for attaching it in an inclined position to the head of a container having an opening therein, the rear wall of the box being partially cut away so as to fit around said opening, a pivoted gate constituting the lower end of the box, and means to latch the gate in any desired position of adjustment.

4. A rectangular gauge box provided with slotted ears secured respectively to the side and end thereof and adapted to be attached to the head of a container having an opening therein, with the box in an inclined position, the rear wall of the box being partially cut away so as to fit around the opening, a transverse rod mounted for rocking movement in the sides of the box, a gate secured to the rod and constituting the lower end of the box, said rod having a crank arm at one end, and means cooperating with the crank arm to latch the gate in any desired position of adjustment.

5. A rectangular gauge box provided with slotted ears secured respectively to the side and end thereof and adapted to be attached to the head of a container having an opening therein, with the box in an inclined position, the rear wall of the box being partially cut away so as to fit around the opening.

6. The combination with a container having a head provided with a discharge opening, of a gauge box secured to said head and having a portion of its rear side wall cut away so as to fit beneath and partially around said opening, said box having an inclined bottom, and means for discharging the contents of said box.

7. The combination with a series of containers each having a head provided with a discharge opening, of a bracket member secured to the base of each container and having a depending arm, a horizontal bracket member supported for vertical adjustment on said depending arm, means secured to the horizontal bracket members for supporting a mold box directly beneath any of said discharge openings, and means secured to the heads of the respective containers beneath the discharge openings for receiving plastic material from said openings and discharging it into a mold box so supported.

8. The combination with a container having a head provided with a discharge opening, of a gauge box secured to said head in an inclined position to receive material which is discharged from said opening, a bracket member secured to and depending from the container, means secured to said bracket member for supporting a mold box directly beneath said gauge box, and a gate at the lower end of the gauge box through which the material may be discharged into a mold box so supported.

9. The combination with a container having a head provided with a discharge opening, of a gauge box secured to said head in an inclined position to receive material which is discharged through said opening, a bracket member secured to and depending from the container, a second bracket member vertically adjustable on the first bracket member and extending forwardly, means carried by the second bracket member for supporting a mold box directly beneath said gauge box, and a gate at the lower end of the gauge box through which the material may be discharged into the mold box so supported.

In testimony that I claim the foregoing as my own, I have hereto affixed my signature.

ALBERT ERNEST ALCHIN.